INVENTOR.
GEBHARD WEIGELE
JOHANN SULZBERGER
BY
ATTORNEYS

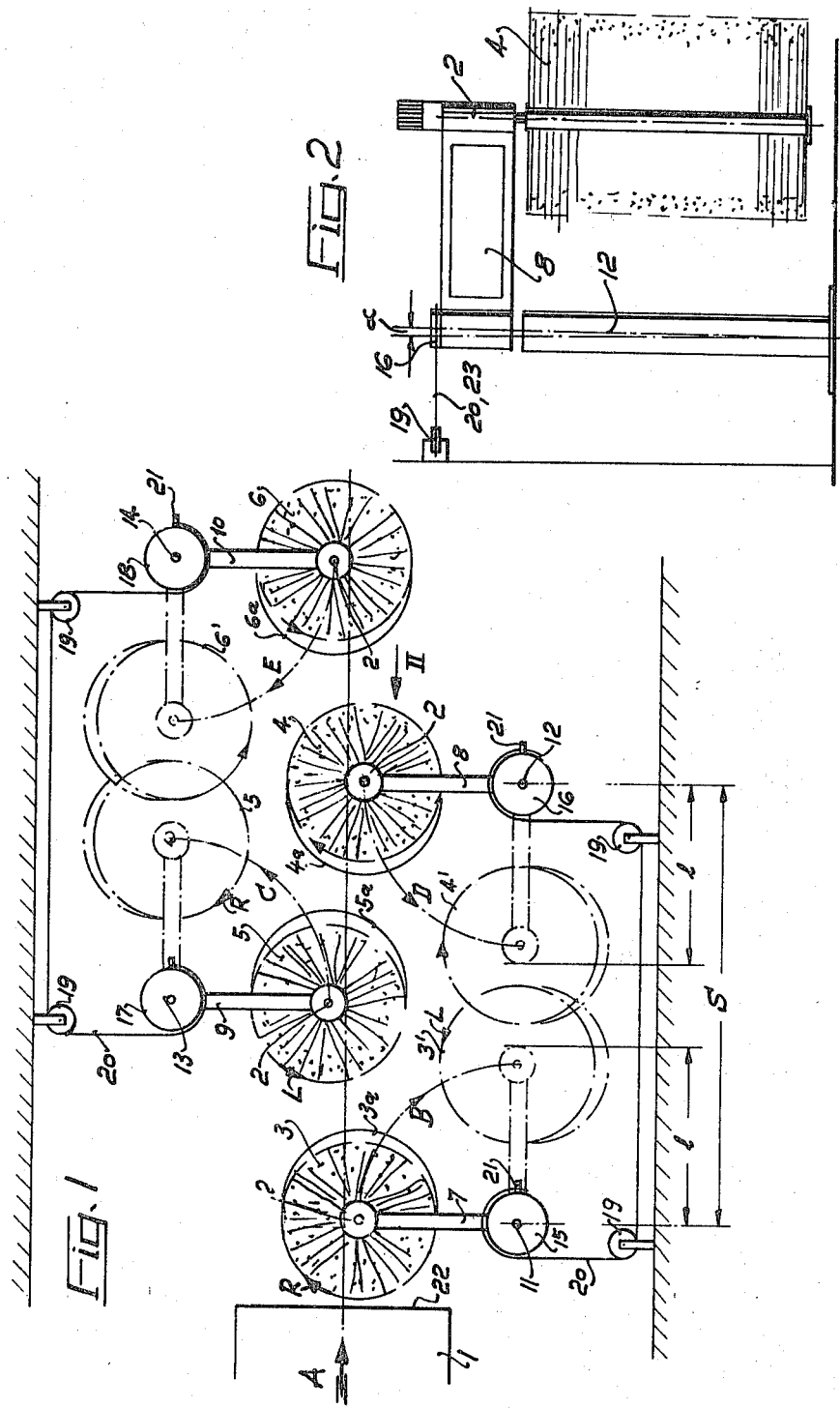

Aug. 4, 1970     G. WEIGELE ET AL     3,522,619
AUTOMATIC WASHING DEVICE FOR CLEANING THE VERTICAL
SIDES OF A MOTOR VEHICLE
Filed March 11, 1968     6 Sheets-Sheet 3
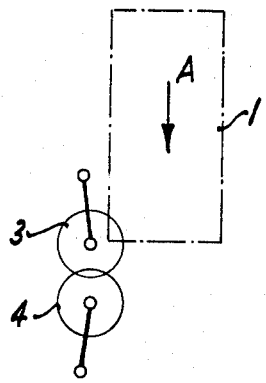
Fig. 3
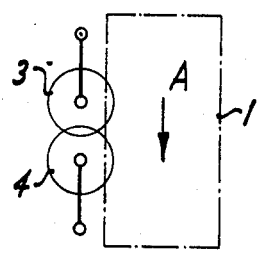
Fig. 4
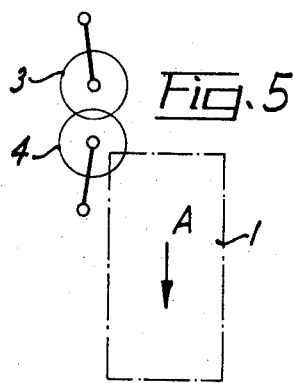
Fig. 5
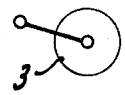
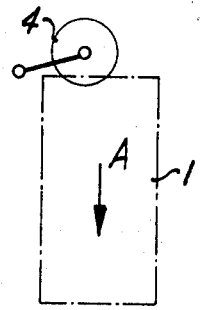
Fig. 6
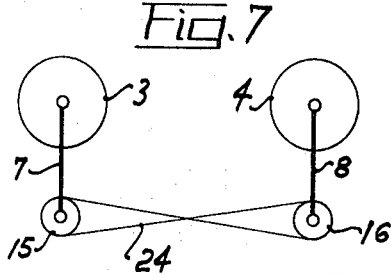
Fig. 7
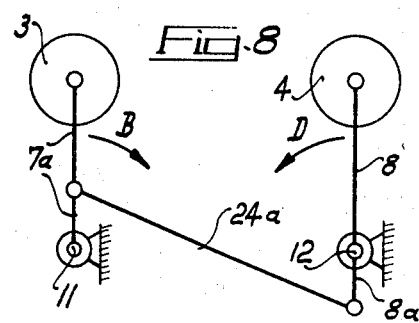
Fig. 8
INVENTORS
GEBHARD WEIGELE
JOHANN SULZBERGER
BY Woodhams, Blanchard & Flynn
ATTORNEYS

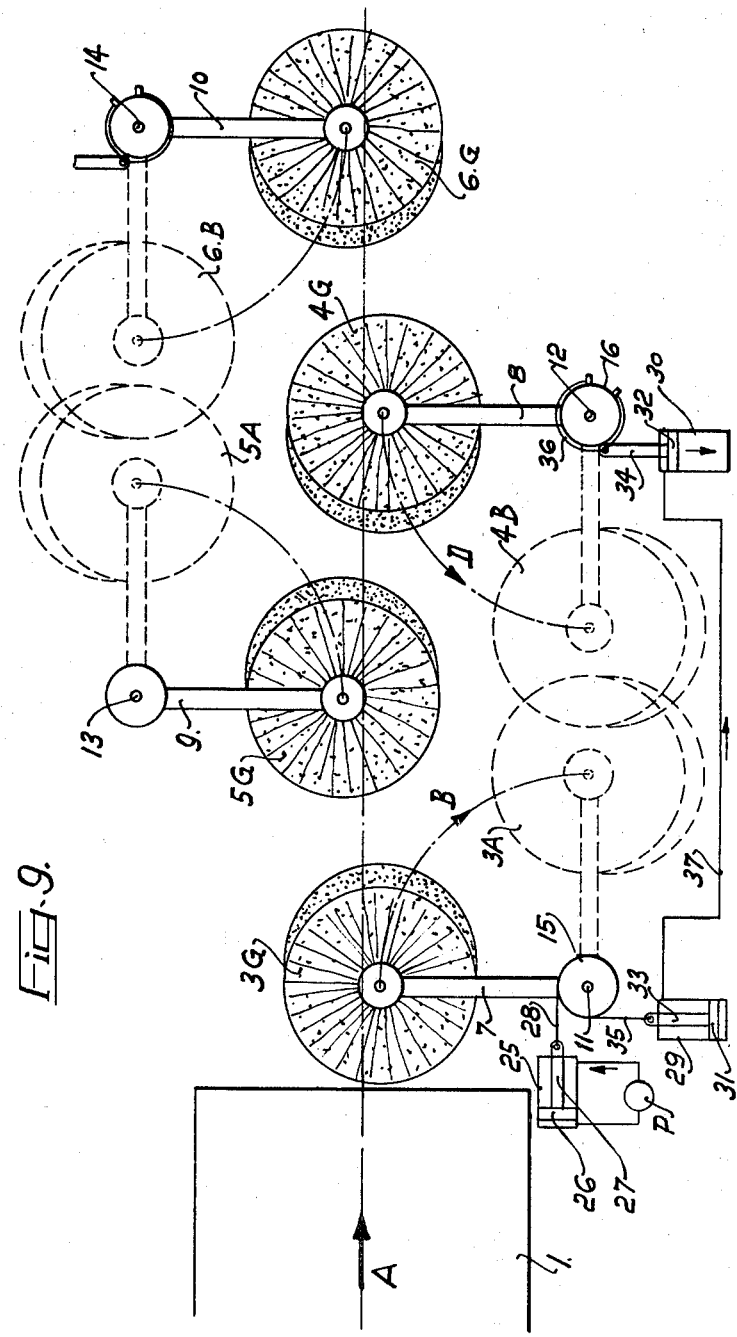

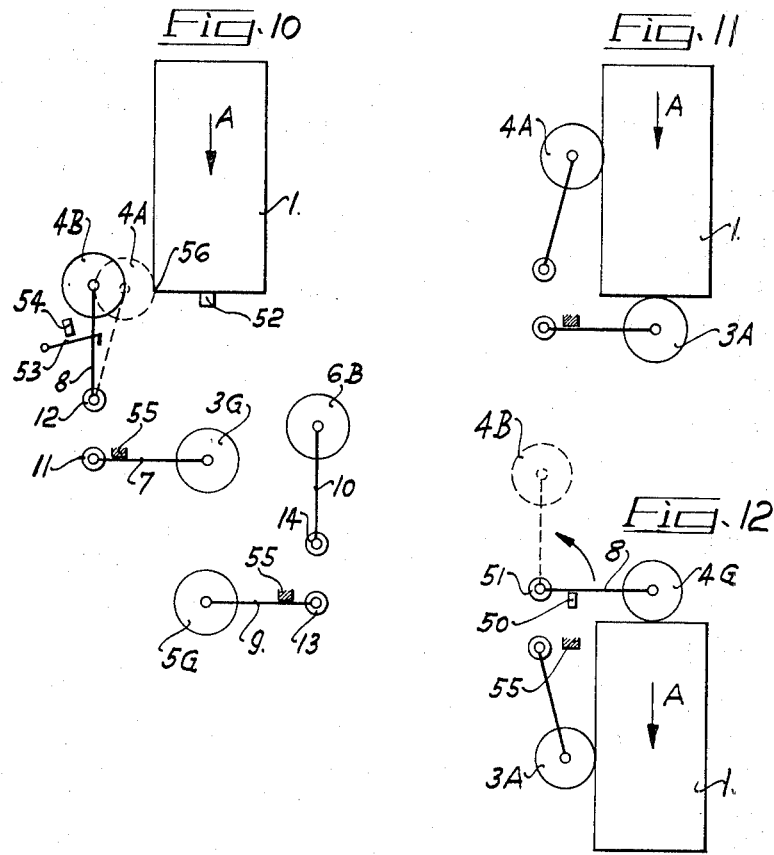

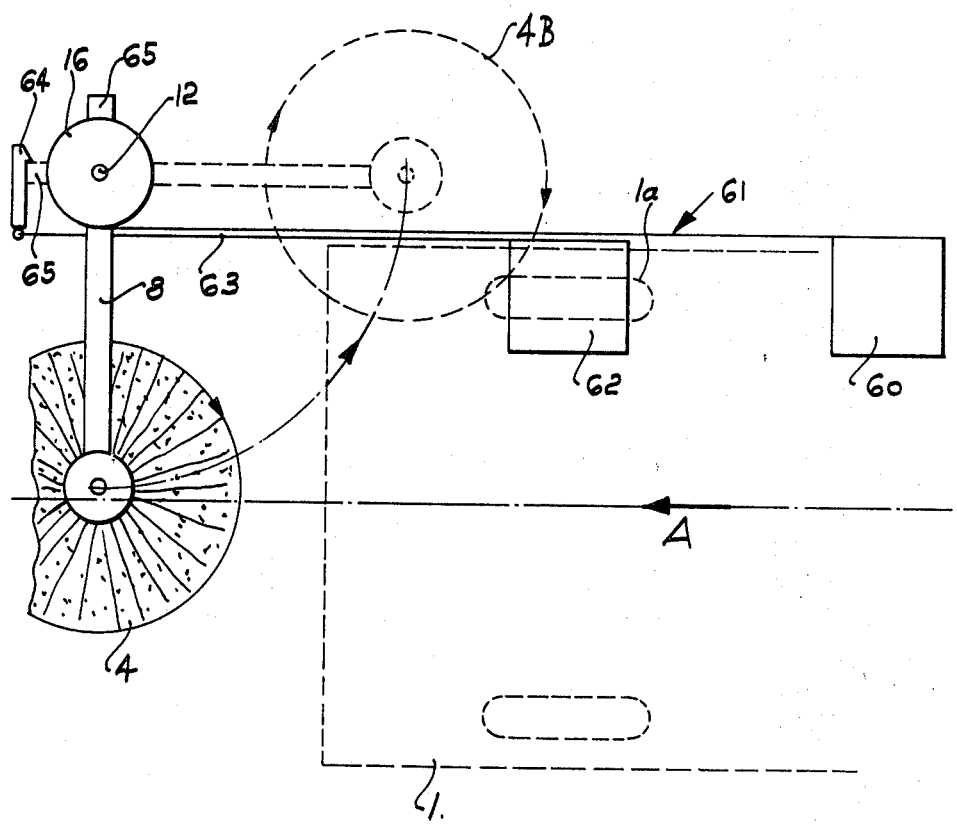

United States Patent Office 3,522,619
Patented Aug. 4, 1970

3,522,619
AUTOMATIC WASHING DEVICE FOR CLEANING THE VERTICAL SIDES OF A MOTOR VEHICLE
Gebhard Weigele, Bussardweg 2, and Johann Sulzberger, Mozartstrasse 17, both of Augsburg, Germany
Continuation-in-part of application Ser. No. 655,237, July 21, 1967. This application Mar. 11, 1968, Ser. No. 712,134
Claims priority, application Germany, Nov. 23, 1967, W 45,210
Int. Cl. B60s *3/06*
U.S. Cl. 15—21                                             11 Claims

ABSTRACT OF THE DISCLOSURE

An automatic washing machine for automobiles in which an automobile advancing through the machine meets a first vertical brush carried on a swinging arm which cleans at least half the front of the automobile and then one side as it is swung aside by contact with the automobile, second brush mounted on a separate swinging arm being swung aside in response to the advance of the automobile so that it cooperates in the cleaning of the side and then swings in to clean at least half of the back of the automobile. The second brush can be mounted after the first brush and swung aside by movement of the first brush or can be moved by a separate drive in response to actuation of a switch by the automobile or by a mechanical linkage to a pressure plate moved by the automobile and in these cases may be mounted before the first brush.

---

This application is a continuation-in-part of my application Ser. No. 655,237, filed July 21, 1967, and now abandoned.

The invention relates to an automatic washing apparatus for vehicles, in particular motor cars, passing therethrough, comprising two vertical brushes which are mounted on swinging arms subjected to a loading moment, the first of which brushes, which is swung by the vehicle, cleaning at least half the front and then one side of the vehicle, while the second brush acts on one side and cleans at least half the back of the vehicle.

In a known washing apparatus of this type, the swinging arm of the first brush of each brush assembly is located at right angles to the longitudinal direction of the vehicle when in the normal position, while the swinging arm of the second brush mounted on the same pivot axis extends in a direction which is opposite to the direction of movement of the vehicle. At the same time, the two swinging arms of each brush assembly are connected by tension springs, so that upon movement of the vehicle against the first brush, both brushes are pressed against the motor vehicle by this tension spring effect. Apart from the fact that this already-known type of construction requires tension springs and also stops which hold the brushes in their normal position, this construction has the disadvantage that in the case of small vehicles, that is motor vehicles of small width, the second brush is at a greater distance in the normal position from the longitudinal side of the vehicle, that is during the forward movement of the vehicle this second brush is pressed only relatively late against the longitudinal side of the vehicle. The front parts of the longitudinal sides of a motor vehicle are therefore not washed by this second brush.

To eliminate the above-mentioned imperfections, according to the invention the swinging axes of the two brushes are arranged at a distance from one another and an arrangement is provided which, in dependence on the movement of the vehicle, brings the second brush, disposed with its swinging arm approximately at right angles to the movement of the vehicle on completion of the cleaning operation, out of this normal position into a position of readiness laterally of a front edge of the vehicle, so that the swinging arm of said brush is then pointing approximately in the opposite direction to the movement of the vehicle. In this new washing apparatus, the second brush is advantageously arranged behind the first brush—as seen in the direction of travel—and the swinging axes of the two brushes are arranged at a distance from one another which is greater than twice the length of a swinging arm. Moreover, moments acting on the swinging arms of both brushes are preferably provided, said moments tending to swing the swinging arms into the normal position at right angles to the advance of the vehicle.

In this new washing apparatus, the second brush is brought out of its normal position into the position of readiness in dependence upon the movement of the vehicle. To this end, the second brush may be controlled directly by the movement of the vehicle in that a switching device is arranged in the path of the vehicle or of the swinging arm of the first brush and is connected to a driving device which swings the swinging arm of the second brush into the position of readiness.

The movement of the second brush from the normal position into the position of readiness may, however, also be effected indirectly by way of the first brush in dependence upon the movement of the vehicle, in that the two brushes are so coupled to one another that the swinging movement of the first brush caused by the advance of the vehicle is transmitted to the second brush with the same amplitude, but in the opposite direction. This coupling of the two swinging arms of the brushes to one another may be effected by mechanical methods by means of cables, linkages or the like, but may also be effected with equivalent means, for example pneumatically or hydraulically.

With this new automatic washing apparatus, not only is the cleaning of the front and back of the vehicle with one brush and the cleaning of the whole of the longitudinal sides of the vehicle with two brushes in each case obtained, but the motor vehicles can also be passed through this washing apparatus with a smaller interval between them, it being moreover impossible for any damage to occur to the washing apparatus with two small a distance between the vehicles.

The details of the invention are described more fully hereinafter with reference to embodiments illustrated in the drawings.

In the drawings:

FIG. 1 is a diagrammatic plan view of an automatic washing apparatus with two pairs of brushes and mechanical coupling by cable;

FIG. 2 is a view in direction II of FIG. 1;

FIGS. 3 to 6 show different working positions of a pair of brushes;

FIG. 7 shows a modified cable coupling for two brushes in plan view;

FIG. 8 is a plan view of a linkage or rod coupling for two brushes;

FIG. 9 shows an automatic washing apparatus according to FIG. 1, but with another control system for the brushes;

FIGS. 10 to 12 show diagrammatically another brush arrangement and another control system for the brushes in different working positions;

FIG. 13 shows another detail in diagrammatic view.

Figure 1A:
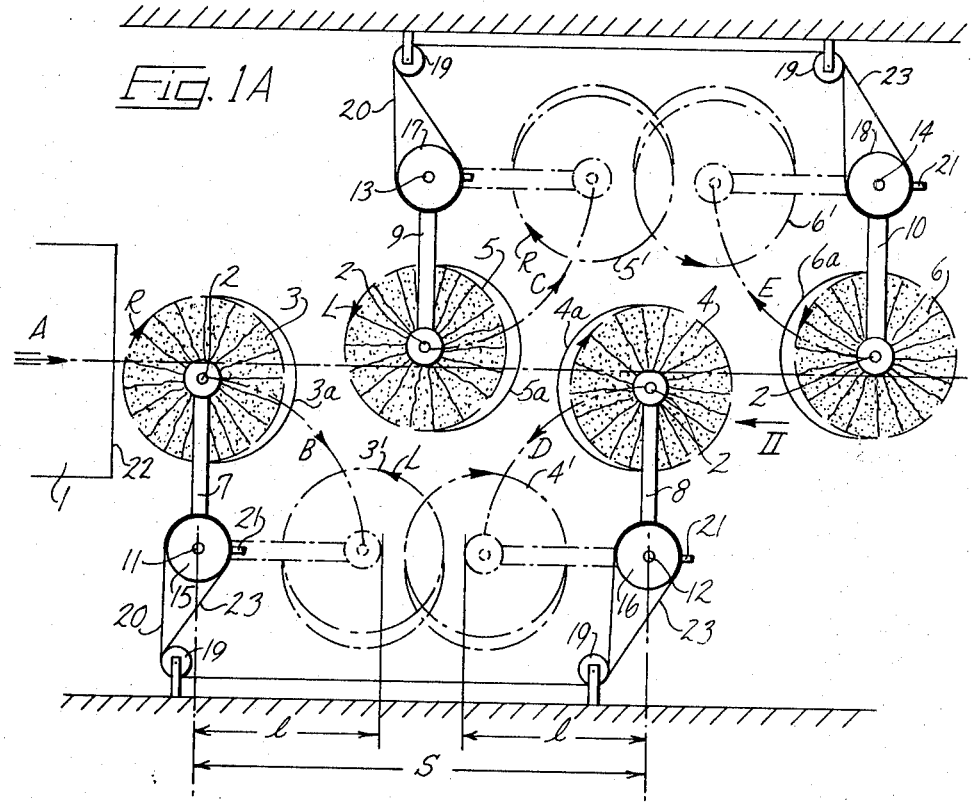
FIG. 1A is a diagrammatic plan view of a modified automatic washing apparatus.

In the drawings, reference 1 designates a motor vehicle which is moved in its longitudinal direction A during the washing operation. The brushes 3 and 4 and 5 and 6, respectively, rotating about a vertical or almost vertical axis 2 form brush assemblies each consisting of two brushes. The brushes 3–6 are mounted on swinging arms 7, 8, 9 and 10, these swinging arms being each mounted to pivot about stationary vertical or almost vertical axes 11, 12, 13 and 14. The second brush 4, 6 is located behind the first brush—as seen in the direction of travel A—and the swinging axes of the two brushes 3 and 4 and 5 and 6, respectively, are arranged at a distance S from one another which is greater than twice the length 1 of a swinging arm. As is apparent from the drawing, the swinging arms 7 and 9 of the first brushes 3 and 5, respectively, are arranged at right angles to the longitudinal direction A of the vehicle when in the normal position, that brush 3, 5 which comes into operation at a particular time being then located approximately in front of the middle of the vehicle. The second brush 4 or 6, respectively, of each pair of brushes is also disposed in the same position when in the normal position, i.e., the swinging arms 8 and 10, respectively, are likewise directed at right angles to the advance A of the vehicle. The swinging arms 7, 8 and 9, 10, respectively, of the two pairs of brushes are so interconnected that the swinging movements B and C, respectively, of the first brushes which are produced by the advance of the vehicle in the direction A are transmitted with the same amplitude, but in the opposite direction, to the second brushes 4 and 6, respectively, so that the latter move in the directions D and E, respectively. To this end, in the embodiment shown in FIGS. 1 and 2, the hubs by which the swinging arms are mounted on the vertical axes 11–14 comprise winding drums 15–18 which are connected by a flexible tension element 20 passed over guide pulleys 19 and which can be wound on and off the drums 15–18. The ends of those tension elements are secured to the winding drums 15–18 at 21. As is evident from the drawing, on movement of the motor vehicle in the direction A, the first brush 3 is swung by the vehicle in the direction B until the brush finally adopts the position 3' (position of readiness) indicated in dash lines, and then, as shown in FIG. 3, this brush washes the front and one longitudinal side of the vehicle. Due to the connection of the two swinging arms 7 and 8 by means of the drums 15, 16 and the tension element 20, the second brush is swung in the direction D into the position 4' shown in dash lines during the movement B, so that, as shown in FIG. 4, the two brushes 3 and 4 then wash one longitudinal side of the motor vehicle. It is apparent from FIGS. 5 and 6 that finally, on further movement of the motor vehicle in the direction A, the second brush 4 also washes one half of the back of the vehicle.

As illustrated in FIG. 2 of the drawing, each of the vertical axes 11–14, here axis 12, are slightly inclined towards the middle of the path of the vehicle, namely, by the amount 2 with respect to the vertical, this amount being only a few centimeters. Owing to this inclination of the swinging axes 11–14, all the washing brushes 3–6 adopt through their own weight the normal position illustrated in solid lines in FIG. 1. When the brushes are swung out of this normal position by the movement of the vehicle in the direction A, the brushes produce by their own weight and the inclined position of the axes a force by which the brushes are pressed against the vehicle.

The brush axes 2 are also advantageously inclined in their normal positions, the first brushes 3 and 5, respectively, being each inclined towards the front 22 of the vehicle and the second brushes 4 and 6, respectively, of each brush assembly being inclined towards the rear of the vehicle in the normal position. These inclinations of the brushes are illustrated in the drawing by the lower boundary lines 3a and 6a. These brush inclinations serve for better adaptation to the slopes of the vertical vehicle walls. In the embodiment shown in FIG. 1A the winding drums 15, 16 and 17, 18, respectively, are moreover so interconnected by a second flexible tension element 23 passed over the glide pulleys 19 and shown in dash lines that the return swinging movement of the brushes (that is in the directions opposite to the directions B–C) is also transmitted in each case from one brush to the other brush. If, therefore, on the commencement of the washing operation, the first brush 3 is swung in the direction B and the second brush 4 is thereby also swung in the direction D, the weight of the brush 4 therefore acts by way of the tension element 23 on the swinging arm 7 of the first brush, so that the force with which the first brush 3 is pressed against the motor vehicle is increased to twice the value. This applies likewise during the washing of the back of the motor vehicle as shown in FIG. 6, during which the brush 4 is likewise pressed against the vehicle with double the force through the additional deadweight of the brush 3. This applies, however, only when another cable 23 passed over the pulleys 19 acts on the drums 15–18 at 21.

FIG. 7 shows another, simplified construction. In this case, a crossed flexible tension element 24 embraces the winding drums 15 and 16 of a brush assembly. This single endless tension element has the same effects as the two above-mentioned tension elements 20 and 23 of FIG. 1.

FIG. 8 shows by way of example another mechanical coupling between the first brush 3 and the second brush 4. The swinging arm 8 has a short extension 8a. The swinging arms 7a and 8, 8a are interconnected by a linkage 24a.

The invention is not limited merely to the constructions hereinbefore described and shown in the drawings. Thus, instead of the effect produced by the inclined position $a$ of the swing axes, another force which urges the brushes in the normal position and against the motor vehicle may be provided. To this end, for example, a torsion spring acting on the swinging arms 7–10 may be provided on each of the swinging axes 11–14, or else weights which act on the swing arms by way of a cable and exert the abovementioned force.

A loading moment on the swinging arms 7–10 may also, for example, be exerted with hydraulic or pneumatic forces. In FIG. 9 a hydraulic or pneumatic cylinder 25 is fed by a pump P or the like and has a piston 26, the rod 27 of which is connected to a flexible tension element 28 which is attached in turn to the winding drum 15. This hydraulic or pneumatic device exerts a torque acting constantly on the brush 3, said torque opposing the swinging movements B and D and urging the brushes constantly against the vehicle or into the normal position shown in FIG. 9.

Hydraulic or pneumatic coupling may also be provided instead of the mechanical coupling of the first and second brushes which is hereinbefore described. To this end, according to FIG. 9, two hydraulic or pneumatic cylinders 29 and 30 are provided, the pistons 31, 32 of which are connected by their rods 33, 34 to a flexible tension element 35, 36, said tension elements being attached to he winding drums 15 and 16, respectively. The two cylinders 29 and 30 are connected to one another by a conduit 37. Thus, in this case, the swinging movement of the brush 3 in the direction B which is caused by the advance A of the vehicle is transmitted hydraulically or pneumatically to the second brush 4, which is then swung in the opposite direction D.

FIGS. 10 to 12 show another embodiment in which the second brushes 4 and 6 are arranged in front of the first brushes 3 and 5, respectively—as seen in the direction of tarvel A—and the swinging axes 11, 12 and 13, 14, respectively, are arranged at a small distance from one another. The brush positions are illustrated by attaching the letters G (normal position), A (working position) and B (position of readiness) to the reference numerals of the brushes. When the second brush has reached its normal position 4G again after the washing operation (see FIG. 12), it must be swung immediately into its position of readiness 4B again. To this end, a switch 50 may be provided in the path of the swinging arm 8, said switch setting in motion a driving device—an electric motor 51 in the example shown—which in turn swings the swinging arm 8 into the position of readiness. Furthermore, a contact lever 52 or the like is provided in the path of the vehicle 1 and actuates a device which brings the second brush out of its position of readiness 4B into the working position 4A at the front edge of the vehicle. For this purpose a locking device 53 in the form of a hook may be provided, this device holding the swing arm 8 in the position 4B. A magnet 54 may be provided, this being actuated by the contact lever 52 and disengaging the locking hook 53. The second brush is then brought out of its position of readiness 4B into the working position 4A and pressed laterally against the front edge 56 of the vehicle.

If necessary, it is also possible to provide stops 55 and these stops hold the swinging arms 7, 9 of the first brushes 3, 5, which swinging arms are subjected to a loading moment, in their normal position. If necessary, the second brush 4, 6 may be brought out of its normal position into the position of readiness by mecehanical methods. To this end, there may be provided in the path of the front wheels of the vehicle a raisable and lowerable pressure plate which is so connected to the swinging arm of the second brush by way of a lever linkage that, when the pressure plate is loaded by the vehicle, it swings the second brush into the position of readiness. This construction is illustrated in FIG. 13. Provided in the path of the front wheel 1a is a raisable and lowerable pressure plate 60 which is connected by way of a lever linkage or a cable 61 to the cable drum 16 or the swinging arm 8 of the second brush 4, so that when the pressure plate 60 is loaded by the front wheel 1a the brush 4 is swung into the position of readiness 4B. In the construction shown, this brush is held in the position of readiness 4B by means of a locking device which may consist of an extension 65 of the swinging arm and a catch 64. Another raisable and lowerable pressure plate 62 is provided in the path of the front wheel 11a. When this pressure plate is depressed, the catch 64 is swung by means of a cable 63 or the like and the locking device is thereby opened, so that the brush 4 is then urged into the working position against the side of the motor vehicle 1.

As illustrated in FIG. 1, the brushes revolve in the respective directions of rotation R and L shown. The The direction of rotation R of the first brush 3 is changed, however, as soon as this brush has been swung into the position 3' shown in chain-dotted lines, so that this brush then revolves in the opposite direction L. This has the advantage that when the side walls of the vehicle are washed the two brushes 3 and 4 (5 and 6) revolve in opposite directions and better cleaning is thereby achieved.

Figure 1B:
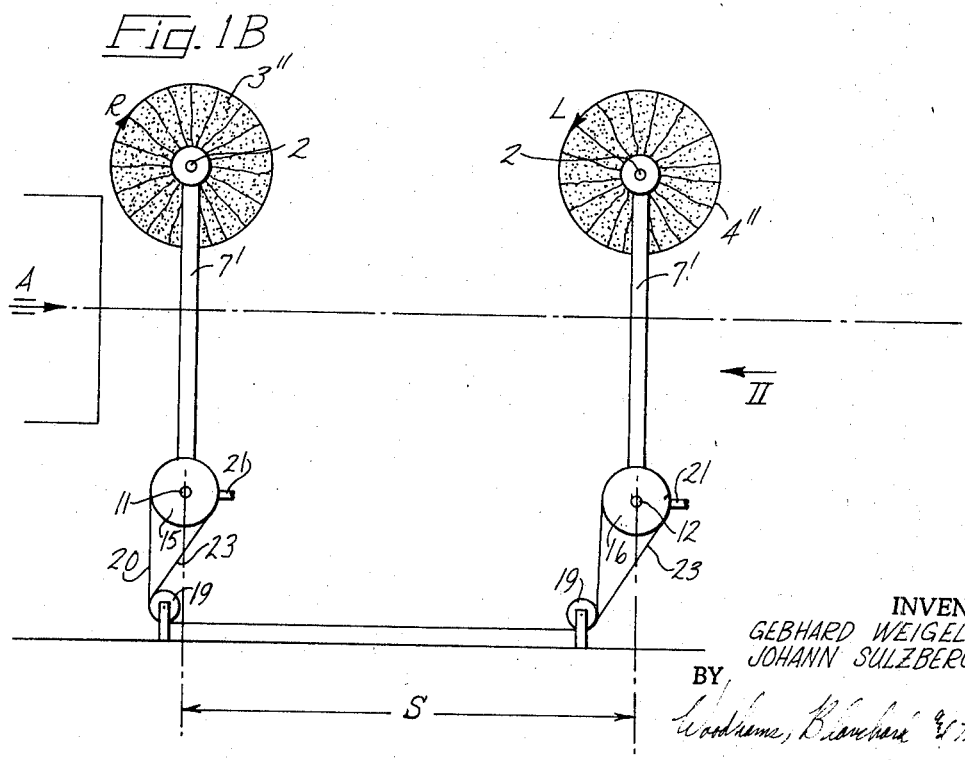
FIG. 1B is a diagrammatic plan view of a further modified automatic washing apparatus.

As illustrated in FIG. 1B, the swinging arms of the brushes may also be longer, as indicated at 7' and 8', so that the brushes (3", 4") then do not merely clean one half of the front and back, but the entire front and back over their full width.

The embodiments of the invention in which an exclusive property or privilege is claimed are defined as follows:

1. Automatic washing apparatus for washing vehicles passing therethrough comprising:
 a pair of vertical brushes;
 arms carrying said brushes;
 said arms being swingably mounted about spaced axes;
 a first of said brushes having a normal position in the track of said vehicle to engage and clean at least half the front of said vehicle and to be swung back by the vehicle and thereafter clean a side of the vehicle;
 the second of said brushes having a normal position in which its arm extends transverse of the track of the vehicle;
 the first brush in its normal position being vertically inclined toward the front of the vehicle and the second brush in its normal position being vertically inclined in the opposite direction toward the back of the vehicle; and
 means responsive to movement of the vehicle to swing the said second brush from its normal position to a position of readiness to one side of the front edge of the vehicle in which the arm extends in a direction approximately opposite to the direction of movement of the vehicle whereby the second brush takes part in the cleaning of one side of the vehicle and is then swung on its arm to clean at least half the back of the vehicle.

2. Washing apparatus as claimed in claim 1 in which the second brush is located after the first brush in the direction of advance of the vehicle and the axis of the swingable arms are spaced by a distance greater than twice the length of the swinging arm.

3. Washing apparatus as claimed in claim 2 in which the means for moving the second brush to its position of readiness comprise a coupling between the first and second brushes such that the swinging movement of the first brush caused by the advance of the vehicle is transmitted to the second brush with the same amplitude but in the opposite direction.

4. Washing apparatus as claimed in claim 3 in which the swinging arms of the two brushes are attached to drums having the same axes of rotation as the arms and the drums are interconnected by a flexible tension element.

5. Washing apparatus as claimed in claim 4 in which the drums are so interconnected by a second flexible tension element that the return swinging movement is also transmitted from one brush to the other.

6. Washing apparatus as claimed in claim 5 in which the two flexible tension elements form a continuous band.

7. Washing apparatus as claimed in claim 3 in which the swinging arms are coupled by a mechanical linkage.

8. Washing apparatus as claimed in claim 1 in which each swinging arm includes biasing means for biasing said swinging arm towards a normal position transverse of the track of the vehicle.

9. Washing apparatus as claimed in claim 8 in which the biasing means is defined by the axes of the swinging arms being both slightly vertically inclined towards the track of the vehicle.

10. Automatic washing apparatus as claimed in claim 1 having a second pair of brushes similarly mounted and arranged to clean the other side of the vehicle.

11. Automatic washing apparatus for washing vehicles passing therethrough comprising:
 a pair of vertical brushes;
 a pair of drums, each being supported for rotation about horizontally spaced vertical axes, each of said drums having a swing arm mounted thereto and rotatable therewith, said swing arms each having one of said pair of vertical brushes rotatably secured thereto;
 a first of said brushes having a normal position in the track of said vehicle to engage and clean at least half the front of said vehicle and to be swung back by the vehicle and thereafter clean a side of the vehicle;
 the second of said brushes having a normal position in which its arm extends transverse of the track of the vehicle; and
 flexible tensioning means connected to and extending between said rotatable drums, said flexible tensioning means being wrapped around both of said drums in the same direction whereby an engagement of the first brush by a vehicle will effect a rotational movement of the first brush and one of said drums in one direction and effect a rotational movement of the second brush and the other of said drums in an opposite direction to a position of readiness to one side of the front edge of the vehicle.

References Cited

UNITED STATES PATENTS 3,233,264  2/1966  Nickl et al. _____ 15—21

FOREIGN PATENTS 1,154,728  9/1963  Germany.
557,459  2/1957  Italy.

EDWARD L. ROBERTS, Primary Examiner

U.S. Cl. X.R.

15—53